United States Patent
Xue et al.

(10) Patent No.: US 8,848,791 B2
(45) Date of Patent: Sep. 30, 2014

(54) COMPRESSED DOMAIN VIDEO WATERMARKING

(75) Inventors: Jingteng Xue, Amherst, NY (US); Jun Tian, Belle Mead, NJ (US); Hong Heather Yu, West Windsor, NJ (US)

(73) Assignee: Futurewei Technologies, Inc., Plano, TX (US)

(*) Notice: Subject to any disclaimer, the term of this patent is extended or adjusted under 35 U.S.C. 154(b) by 525 days.

(21) Appl. No.: 13/198,371

(22) Filed: Aug. 4, 2011

(65) Prior Publication Data
US 2012/0076206 A1 Mar. 29, 2012

Related U.S. Application Data

(60) Provisional application No. 61/387,840, filed on Sep. 29, 2010.

(51) Int. Cl.
H04N 7/12 (2006.01)
H04N 19/61 (2014.01)
H04N 19/48 (2014.01)

(52) U.S. Cl.
CPC ... *H04N 19/00781* (2013.01); *H04N 19/00563* (2013.01)
USPC .................................................. 375/240.13

(58) Field of Classification Search
USPC ....................................... 375/240.01, 240.13
See application file for complete search history.

(56) References Cited

U.S. PATENT DOCUMENTS

| | | | |
|---|---|---|---|
| 2002/0126870 A1* | 9/2002 | Wendt | 382/100 |
| 2004/0008923 A1* | 1/2004 | Anzai et al. | 385/16 |
| 2005/0074139 A1* | 4/2005 | Seo et al. | 382/100 |
| 2009/0175335 A1* | 7/2009 | Baudry et al. | 375/240.12 |
| 2010/0150394 A1* | 6/2010 | Bloom et al. | 382/100 |
| 2011/0176013 A1* | 7/2011 | Robertson et al. | 348/208.4 |

OTHER PUBLICATIONS

Mansouri, A., et al., "A Low Complexity Video Watermarking in H.264 Compressed Domain," IEEE Transactions on Information Forensics and Security, Dec. 2010, pp. 649-657, vol. 5, No. 4.
Noorkami, M., et al., "A Framework for Robust Watermarking of H.264-Encoded Video With Controllable Detection Performance," IEEE Transactions on Information Forensics and Security, Mar. 2007, pp. 14-23, vol. 2, No. 1.
Noorkami, M., et al., "Digital Video Watermarking in P-Frames With Controlled Video Bit-Rate Increase," IEEE Transactions on Information Forensics and Security, Sep. 2008, pp. 441-455, vol. 3, No. 3.
Zhang, J., "Robust Video Wtermarking of H.264/AVC," IEEE Transactions on Circuits and Systems-II, Express Briefs, Feb. 2007, pp. 205-209, vol. 54, No. 2.
Golikeri, A., "Robust digital video watermarking scheme for H.264 advanced video coding standard," Journal of Electronic Imaging, 043008, Oct.-Dec. 2007, pp. 043008-1-043008-14, vol. 16(4).

* cited by examiner

*Primary Examiner* — Dave Czekaj
*Assistant Examiner* — Tracy Li
(74) *Attorney, Agent, or Firm* — Slater & Matsil, L.L.P.

(57) ABSTRACT

In accordance with an embodiment, a method of watermarking encoded video frames includes electronically receiving a bitstream comprising a plurality of encoded video frames that are divided into a plurality of macro-blocks, determining macro-block dependencies based on prediction information in the received bitstream, determining a set of macro-blocks having a minimal number of macro-block dependencies, and embedding a watermark in a plurality of macro-blocks selected from the set of macro-blocks having the minimal number of macro-block dependencies.

27 Claims, 3 Drawing Sheets

COMPRESSED DOMAIN VIDEO WATERMARKING

This patent application claims priority to U.S. Provisional Application No. 61/387,840 filed on Sep. 29, 2010, entitled "Compressed Domain Video Watermarking," which application is incorporated by reference herein in its entirety.

TECHNICAL FIELD

The present invention relates to image processing, and, in particular embodiments, to compressed domain video watermarking.

BACKGROUND

Video compression refers to reducing the quantity of data used to represent digital video images, and uses a combination of spatial image compression and temporal motion compensation. Video compression may also be viewed as a conceptual example of source coding in information theory. Several methods are known for video compression such as H.264/MPEG-4 Part 10 or AVC (Advanced Video Coding). H.264 is a block-oriented motion-compensation-based codec standard developed by the ITU-T Video Coding Experts Group (VCEG) together with the ISO/IEC Moving Picture Experts Group (MPEG).

Digital watermarking is the process of embedding information into a digital signal in a way that is difficult to remove. The digital signal may represent, for example, audio, picture, video or other information. If the digital signal is copied, then the watermark information is also carried in the copy. A signal may carry several different watermarks at the same time.

In visible watermarking, the information is visible in the picture or video. Typically, the information is text or a logo which identifies the owner of the media. One common example of using a visible watermark is when a television broadcaster adds its logo to the corner of transmitted video program material.

In invisible watermarking, however, information is added as digital data to audio, picture or video data, but the watermark is not visibly or audibly perceived as such, although it may be possible to detect that some amount of information is hidden. The watermark may be intended for widespread use and is thus be easy to retrieve or it may be a form of steganography, where a party communicates a secret message embedded in the digital signal. In either case, as in visible watermarking, the objective is to attach ownership or other descriptive information to the signal in a way that is difficult to remove. It is also possible to use hidden embedded information as a means of covert communication between individuals.

One application of watermarking is in copyright protection systems, which are intended to prevent or deter unauthorized copying of digital media. In this use, a copy device retrieves the watermark from the signal before making a copy, and the device makes a decision to copy or not depending on the contents of the watermark. Another application is in source tracing. A watermark is embedded into a digital signal at each point of distribution. If a copy of the work is found later, then the watermark can be retrieved from the copy and the source of the distribution is known. This technique has been reportedly used to detect the source of illegally copied movies. Annotation of digital photographs with descriptive information is another application of invisible watermarking.

Previously, robust watermarking for H.264 video is based on using an uncompressed domain technique, or using a joint encoded technique. With respect to the uncompressed domain technique, the video is uncompressed first, and then it is watermarked with an uncompressed domain watermarking technique. For joint encoding, a watermark is embedded during the H.264 encoding process. This is also more difficult due to the fact that one single change in the bit stream may introduce an unwanted error that propagates to future blocks or future frames.

SUMMARY OF THE INVENTION

In accordance with an embodiment, a method of watermarking encoded video frames includes electronically receiving a bitstream comprising a plurality of encoded video frames that are divided into a plurality of macro-blocks, determining macro-block dependencies based on prediction information in the received bitstream, determining a set of macro-blocks having a minimal number of macro-block dependencies, and embedding a watermark in a plurality of macro-blocks selected from the set of macro-blocks having the minimal number of macro-block dependencies.

In accordance with a further embodiment, a method of detecting a watermarked video bitstream includes electronically receiving a bitstream comprising plurality of encoded video frames, where each video frame is divided into macro-blocks. The method further includes determining watermark metrics in a set of macro-blocks on which a minimal number of further macro-blocks are dependent, and comparing the determined watermark metrics to a reference set of watermark metrics.

In accordance with a further embodiment, a system for watermarking an encoded video bitstream includes an analysis block, a selection block coupled to the analysis block, and an embedding block coupled to the selection block. The analysis block is configured to determine dependencies of macro-blocks within the encoded video bitstream based on prediction information within the encoded video bitstream, the selection block is configured to select a set of macro-blocks based on determined dependencies of the macro-blocks, and the embedding block configured to embed a watermark portions in the set of selected macro-blocks.

In accordance with a further embodiment, a non-transitory computer readable medium has an executable program stored thereon that instructs a processor to receive a bitstream that has a plurality of encoded video frames, where each video frame is divided into a plurality of macro-blocks. The program also instructs the processor to determine macro-block dependencies based on prediction information in the received bitstream, determine a set of macro-blocks having a minimal number of macro-block dependencies, and embed a watermark in a plurality of macro-blocks selected from the set of macro-blocks having a minimal number of macro-block dependencies.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In an embodiment a robust watermarking approach in the compressed domain for H.264 video is used. Here, the watermark is only written in the selected macro-blocks with limited number of referee blocks in order to control error propagation with minimum computation. It should be appreciated that embodiment systems and method may be used for other data stream types besides H.264 video, such as MPEG-2, VC1, VP8 and others.

Figure 1:
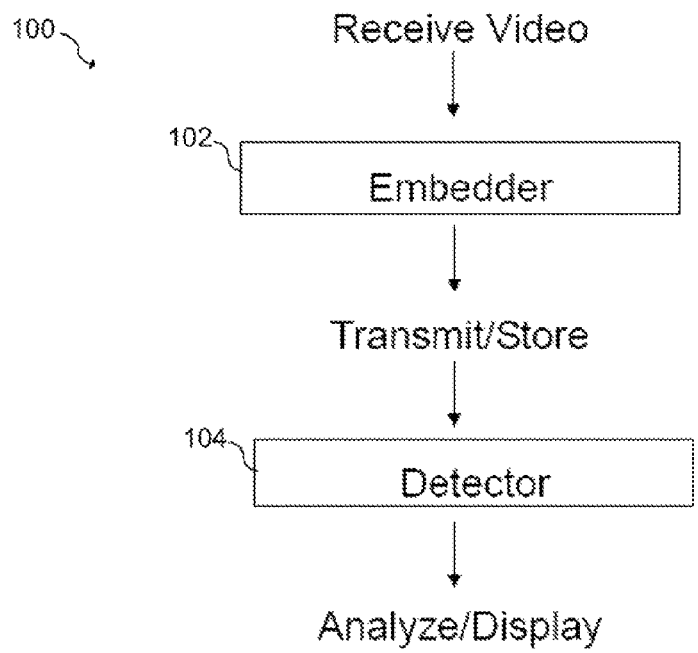
FIG. 1 illustrates a simplified block diagram of an embodiment system.

As shown in FIG. 1, a first embodiment watermarking system 102 includes two main components: embedder 102 and detector 104. Embedder 102 partially decodes the H.264 bit stream, analyzes the dependencies among macro-blocks, detects the candidate blocks, embeds watermark bits into selected luma residual transform domain coefficients of the candidate macro-blocks, and outputs a H.264 bit stream along with the location information of the embedded macro-blocks. Detector 104 compares the watermarked video with an original video and retrieves the watermark by computing the differences at the indicated block areas.

As shown in FIG. 1, embedder 102 may receive video content from any source. This source can be a local memory or a remote server connected by a network or anything in between. Once the watermark is embedded in the image, the video may be transmitted to another location and/or stored for viewing or transmission later, as just two examples. In an embodiment, detector 104 receives the image with the watermark to detect the watermark. This detection can be used for analysis or display, as just two examples. While shown as a single block, it is understood that each of the blocks can be implemented with several blocks that can perform subtasks as described herein.

The superior compression efficiency of the H.264 standard relies on the strong prediction dependencies within the coded video signal. In the H.264 bit stream, information describing a certain block may have direct or indirect influence to a much bigger area. When a watermarking operation attempts to change this information, the prediction error will propagate to the rest of the big area and in many cases cause visual artifact. Compensation schemes that correct this problem generally have high complexity. It is a major concern of H.264 watermarking design to control and minimize the error propagation with minimal computation.

Figure 2A:
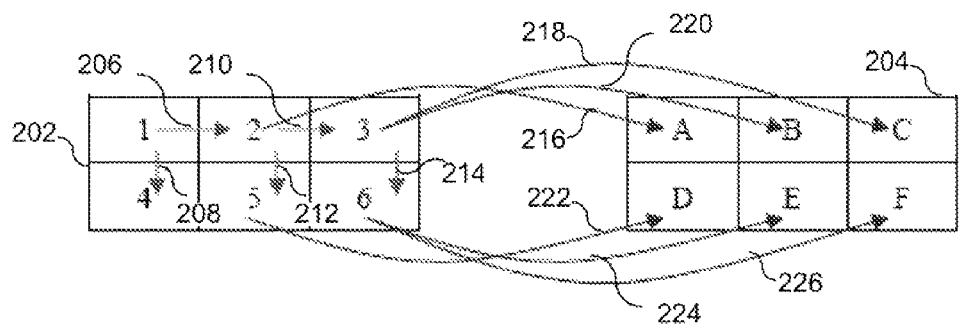
FIGS. 2a-b, illustrate an embodiment macro-block referring map and a hierarchical structure of macro-block prediction dependencies.
Figure 2B:
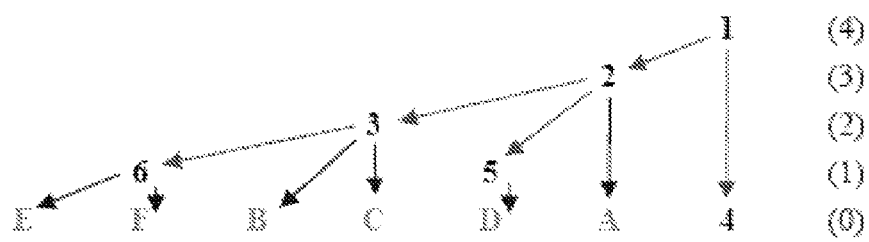

An embodiment scheme first analyzes the prediction dependencies of a target video and then embeds watermarks only in the selected macro-blocks that will minimize error propagation. FIGS. 2a and 2b illustrate an example of the analysis and selection process.

FIG. 2a illustrates two sets 202 and 204 of macro-blocks that make up a video frame or a portion of a video frame, as well as the dependencies between the macro blocks for each frame. In one embodiment, each macro-block comprises a block of 16 by 16 pixels; however, macro-blocks may comprise a different dimension depending on the application and its particular specifications. Each illustrated macro-block set shows six macro-blocks for simplicity of illustration. In actual embodiments, any number of macro-blocks may be in a video frame.

In frame 202, arrows 206, 208, 210, 212 and 214 show macro-block intra-frame dependencies. For example, macro-block 2 of frame 202 is dependent on macro-block 1 of frame 202, meaning, for example that content in macro-block 2 depends, at least in part, in the content of macro-block 1. Arrows 216, 218, 220, 222, 224 and 226, on the other hand, illustrate inter-frame dependencies. For example, content in macro-block A of frame 204 is dependent, at least in part, in content in macro-block 2 of frame 202, as denoted by arrow 216. In an embodiment, a macro-block at the head of an illustrated arrow uses the macro-block at the start of this arrow as prediction.

After reading the prediction modes of the macro-blocks of the two frames 202 and 204, the dependency relation may be shown as in FIG. 2b. The macro-blocks classified in layer 0 are those blocks have no other macro-blocks referring to them, namely, macro-blocks A, B, C, D, E and F in frame 204 and macro-block 4 in frame 202. Layer k macro-blocks have only macro-blocks in level with number smaller than k referring to them. In embodiments, a higher layer macro-block has more visual influence on the video than a lower layer macro-block.

After analysis, the number of layers used for watermarking is computed according to the required bit rate of the watermark signal and the amount of macro-blocks in each layer, which is further determined by the nature of the target video content. Next, embedder writes the watermark signal into the macro-blocks within the decided number of low layers. An optional compensation can be performed at the same time of embedding to enhance the fidelity, although without compensation the error propagation is perceptually unobvious and/or visually imperceptible because the selected macro-blocks represents the visual content with the least span in spatial or temporal domain.

In an embodiment, watermarking procedures further include watermark payload preparation. Prior to embedding, the watermark message payload is binarized and modulated by a pseudo random sequence generator. This step enhances the watermarking robustness.

Figure 3:
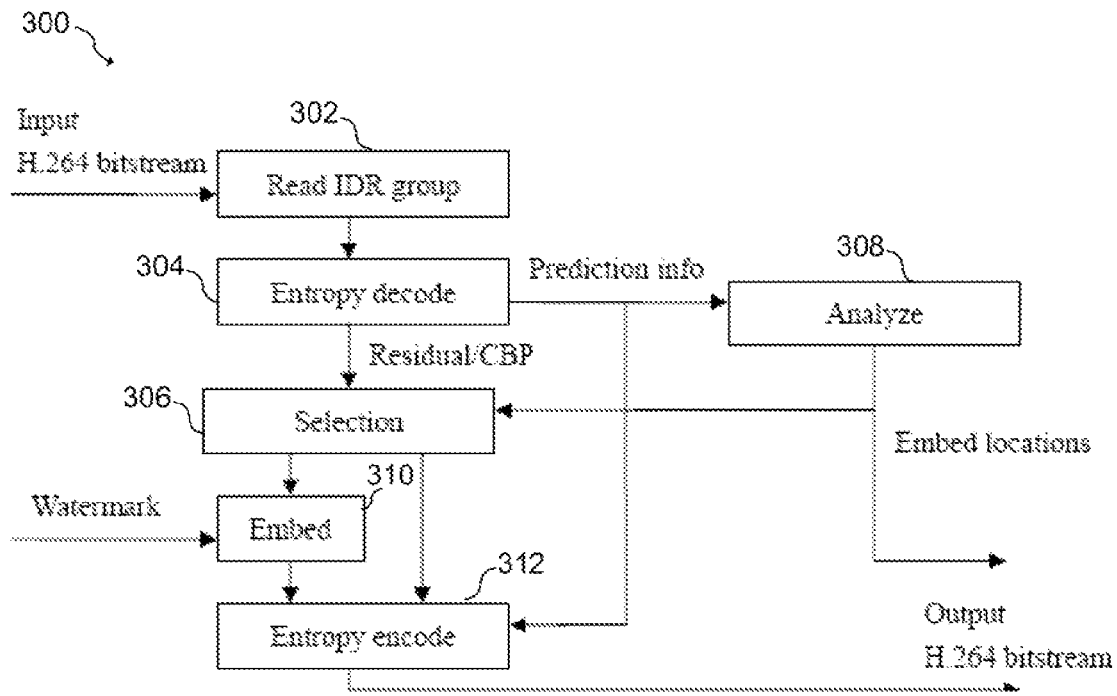
FIG. 3 provides a block diagram of an embodiment watermark embedder.

FIG. 3 illustrates a block diagram of embodiment watermark embedding system 300. In an embodiment, read instantaneous decoder refresh (IDR) block 302 reads network abstraction layer (NAL) units from a H.264 bit stream and buffers one IDR group (frames between two IDR frames) at a time. Entropy decoder 304 decodes the stream and retrieves prediction information, the coded block pattern (CBP) and residual data. The prediction information of an entire IDR group is first fed to analysis module 308 while the rest of the data, such as the Residual/coded block pattern (CBP) data is buffered in memory. Analysis module 308 builds a link list to map the prediction relationship of the macro-blocks and sorts the prediction relationship them by their layers. Analysis module 308 then counts the number of available blocks in each layer, computes the start layer for watermark, marks the position of selected macro-blocks, and then copies this information to embedder 310 and the output.

Selection block 306 selects the residual data of the candidate macro-blocks. If the selected macro-block is not skipped, embedder 310 embeds one watermark bit to it by modifying its DC coefficient (+1 or −1 to embed 1 or 0) and then updates its corresponding CBP. In some embodiments, this DC coefficient is a DC bin in a DCT domain. In alternative embodiments, the macro-block may be watermarked by quantization schemes such as QIM, etc.

In an embodiment, entropy encoder 312 performs entropy encoding to re-assemble the components to a H.264 bit stream and outputs the embedded H.264 bit stream along with the block location information.

In an embodiment, watermark retrieval may be performed by using a detector that compares the watermarked video with the original video and retrieves the watermark by computing the differences at the indicated block areas. In an embodiment, the detector entropy decodes the watermarked bitstream and compares DC values of the macro-blocks in the watermarked bitstream to corresponding macro-blocks in the original video or a bitstream corresponding to the original video. Alternatively, the detector may compare another watermark metric of the macro-blocks besides the DC value, such as quantization residue, etc.

Figure 4:
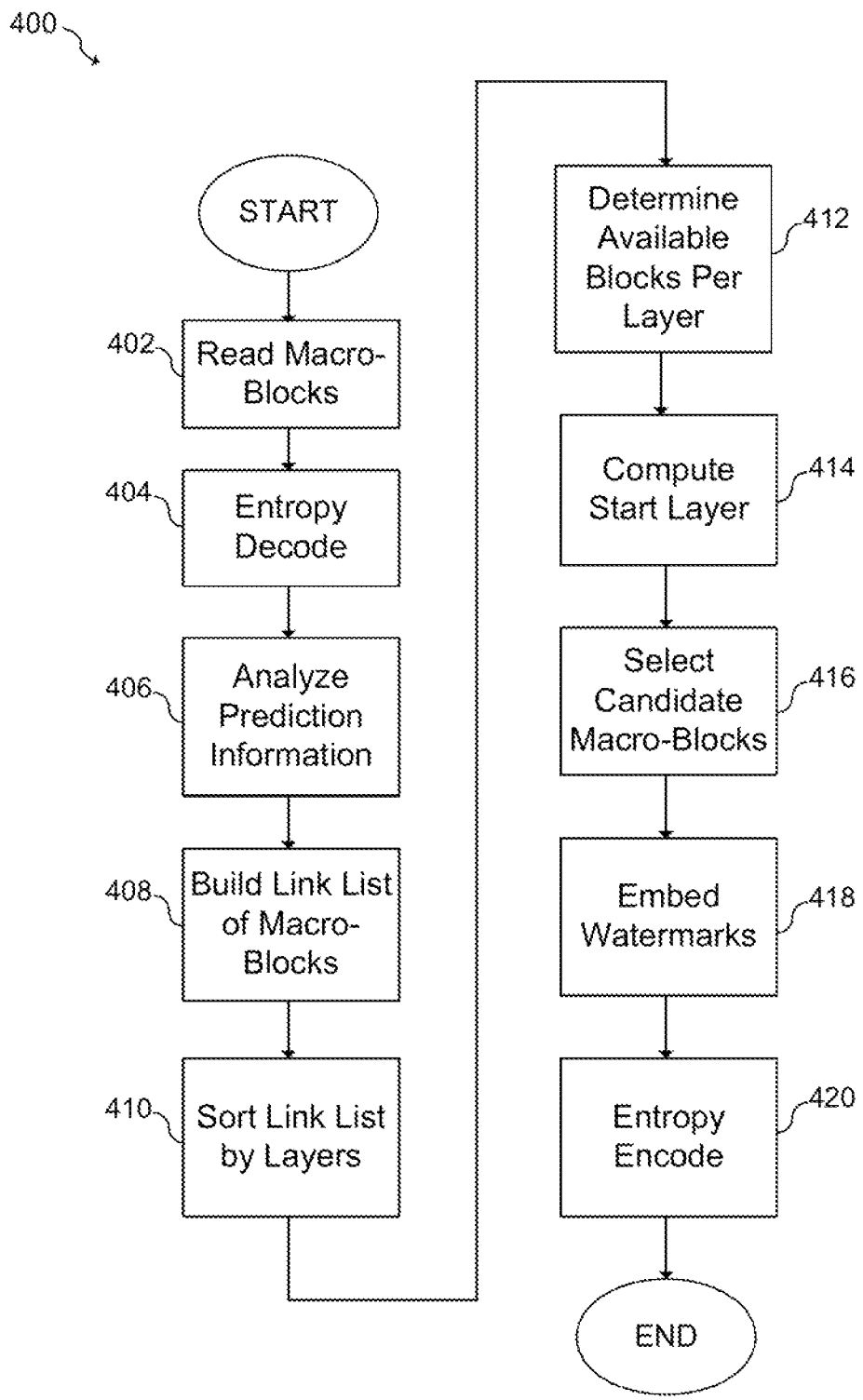
FIG. 4 illustrates an embodiment watermarking method.

FIG. 4 illustrates watermarking method 400 according to an embodiment of the present invention. In step 402, macro-blocks of a H.264 bitstream or other suitable digital video signal are read, and an entropy decode is performed (step 404). Next, in step 406, prediction information from the bitstream is used to analyze macro-block dependencies, and a link list of macro-block dependencies is generated in step 408. The link-list is sorted by layers, as discussed above in step 410, and the number of available blocks per layer is determined (step 412). A start layer of the link list is determined (step 414) and candidate macro-blocks are selected (step 416) in order to minimize the number of macro-block dependencies. Next, in step 418, watermarks are embedded by adjusting the DC level of the selected macro-blocks, and the bitstream is reassembled and entropy encoded in step 420.

In an embodiment, the watermark in the bitstream that was encoded in step 410 may be recovered by performing an entropy decode and comparing the DC levels of the selected macro blocks to DC levels of a known good source video.

Figure 5:
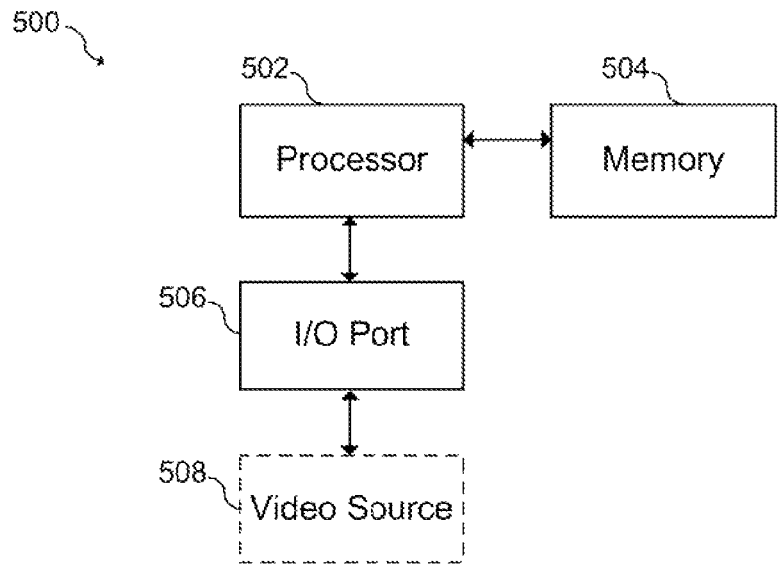
FIG. 5 shows an embodiment of a system of the present invention.

FIG. 5 illustrates processing system 500 that may be utilized to implement embodiment methods. In this case, the main processing is performed by processor 502, which can be a microprocessor, digital signal processor or any other appropriate processing device. Program code (e.g., the code implementing the algorithms disclosed above) and data can be stored in a memory. Memory 504 can be local memory such as DRAM or mass storage such as a hard drive, optical drive or other storage (which may be local or remote). While memory 504 is illustrated functionally with a single block, it is understood that one or more hardware blocks can be used to implement this function.

In one embodiment, processor 502 can be used to implement the embedder and detector shown in FIG. 1. In another embodiment, the processor can be used to implement various blocks shown in FIG. 3. For example, processor 502 can serve as a specific functional unit at different times to implement the subtasks involved in performing the techniques of the present invention. Alternatively, different hardware blocks (e.g., the same as or different than the processor) can be used to perform different functions. In other embodiments, some subtasks are performed by the processor while others are performed using a separate circuitry.

FIG. 4 also illustrates I/O port 506, which can be used to provide the video to and from the processor. Video source 508 (the destination is not explicitly shown) is illustrated in dashed lines to indicate that it is not necessary part of the system. For example, the source can be linked to the system by an network such as the Internet or by local interfaces (e.g., a USB or LAN interface)

Advantages of embodiments include the ability to provide a quick and effective way to minimize the error propagation of H.264 robust watermark. For example, by embedding the watermark after the entropy decode step, time and computing resources are saved by not completely decoding the entire video. Furthermore, in embodiments that watermark the DC level of macro-blocks, watermark detecting is quick and efficient because a complete decode of the video signal is not necessary. Further advantages include imperceptibility of watermark, and robustness against video operation and malicious attacks, etc.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of watermarking encoded video frames, the method comprising:
   electronically receiving a bitstream comprising a plurality of encoded video frames, each video frame being divided into a plurality of macro-blocks;
   determining macro-block dependencies based on prediction information in the received bitstream;
   determining a set of macro-blocks having a lowest number of macro-block dependencies; and
   embedding a watermark in macro-blocks selected from the set of macro-blocks having the lowest number of macro-block dependencies, wherein the number of macro-block dependencies associated with a given macro-block corresponds to a number of neighboring macro-blocks referenced during inter-frame and intra-frame prediction of the given macro-block.

2. The method of claim 1, wherein determining the set of macro-blocks having a lowest number of macro-block dependencies comprises selecting macro-blocks on which no-other macro-blocks are dependent.

3. The method of claim 1, further comprising entropy decoding the bitstream before determining the macro-block dependencies.

4. The method of claim 1, further comprising:
assembling an output bitstream comprising watermarked macro-blocks; and
entropy encoding the assembled output bitstream.

5. The method of claim 1, wherein embedding the watermark comprises adjusting DC values of the selected plurality of macro-blocks according to a determined watermark.

6. The method of claim 1, wherein the bitstream comprises a video stream.

7. The method of claim 6, wherein the bitstream comprises a H.264 video stream.

8. A method of watermarking encoded video frames, the method comprising:
electronically receiving a bitstream comprising a plurality of encoded video frames, each video frame being divided into a plurality of macro-blocks;
determining macro-block dependencies based on prediction information in the received bitstream;
determining a set of macro-blocks having a minimal number of macro-block dependencies; and
embedding a watermark in a plurality of macro-blocks selected from the set of macro-blocks having the minimal number of macro-block dependencies,
wherein determining the set of macro-blocks having the minimal number of macro-block dependencies comprises:
analyzing the prediction information;
building a link-list of macro-block dependencies based on analyzing the prediction information;
sorting the link list by dependency layers;
determining a number of available macro-blocks per dependency layer;
computing a start layer based on the number of macro-blocks per dependency layer and a bit rate of a watermark signal; and
selecting the set of macro-blocks having a minimal number of macro-block dependencies based on the computed start layer.

9. The method of claim 8, wherein each dependency layer comprises macro-blocks having a same number of macro-blocks referring to them.

10. The method of claim 8, wherein selecting comprises selecting macro-blocks on which no other macro-blocks are dependent.

11. A method of detecting a watermarked video bitstream, the method comprising:
electronically receiving a bitstream comprising a plurality of encoded video frames, each video frame being divided into macro-blocks;
determining macro-block dependencies based on prediction information in the received bitstream; and
retrieving watermarks from the bitstream by determining watermark metrics for macro-blocks in a set of macro-blocks on which a lowest number of neighboring macro-blocks are dependent, and comparing the determined watermark metrics to a reference set of watermark metrics, wherein the number of neighboring macro-blocks dependent on a given macro-block corresponds to a number of neighboring macro-blocks referenced during intra-frame and inter-frame prediction of the given macro-block.

12. The method of claim 11, wherein determining the watermark metrics in the set of macro-blocks comprises determining DC values of the macro-blocks.

13. The method of claim 12, wherein comparing watermark metrics comprises computing a difference between the determined DC values to DC values of macro-blocks of an original video bitstream.

14. The method of claim 11, further comprising entropy decoding the bitstream before determining the watermark.

15. A system for watermarking an encoded video bitstream, the system comprising:
an analysis block configured to determine dependencies of macro-blocks within the encoded video bitstream based on prediction information within the encoded video bitstream; wherein the encoded video bitstream comprises a H.264 video steam;
a selection block coupled to the analysis block, the selection block configured to select a set of macro-blocks having the lowest number of the macro-blocks; and
an embedding block coupled to the selection block, the embedding block configured to embed a watermark portions in the set of macro-blocks having the lowest number of macro-block dependencies, wherein the number of macro-block dependencies associated with a given macro-block corresponds to a number of neighboring macro-blocks reference during inter-frame and intra-frame prediction of the given marco-block.

16. The system of claim 15, further comprising:
an entropy decoder coupled to the analysis block, the entropy decoder configured to entropy decode the encoded video bitstream; and
an entropy decoder coupled to the analysis block, the entropy decoder configured to assemble an output bitstream comprising the set of selected macro-blocks having the embedded watermark portions, and entropy encode the assembled output bitstream.

17. The system of claim 16, further comprising an input reading block having an output coupled to an input of the entropy decode block, the input reading block configured to read groups of macro-blocks from the encoded video bitstream.

18. The system of claim 15, wherein the analysis block is further configured to:
analyze prediction information from the encoded video bitstream;
determine intra-frame and inter-frame dependencies of the macro-blocks based on the analyzed prediction information; and
build a link-list of the macro-block dependencies based on the intra-frame and inter-frame dependencies.

19. The system of claim 15, wherein the selection block is further configured to select a set of macro-blocks having a minimal number of macro-block dependencies.

20. The system of claim 19, wherein the set of macro-blocks having a minimal number of macro-block dependencies comprises a set of macro-blocks having no macro-block dependencies.

21. The system of claim 15, wherein the selection block is further configured to:
receive a link-list of macro-block dependencies from the analysis block;

sort the link-list by dependency layers, each dependency layer comprising macro-blocks having a same number macro-block dependencies;

determine a number of available macro-blocks per dependency layer;

compute a start layer of the dependency layers based on the number of available macro-blocks per layer and a bit rate of a watermark signal; and select the set of macro-blocks having a minimal number of macro-block dependencies based on the computed start layer.

22. The system of claim 15, wherein the selection block is configured to select the set of macro-blocks having the lowest number of macro-block dependencies, and
wherein the embedding block is configured to embed the watermark in macro-blocks selected from the set of macro-blocks having the lowest number of macro-block dependencies.

23. The system of claim 22, wherein the number of macro-block dependencies associated with a given macro-block corresponds to a number of neighboring macro-blocks referenced during inter-frame and intra-frame prediction of the given macro-block.

24. A non-transitory computer readable medium having an executable program stored thereon, wherein the program instructs a processor to perform the steps of:
receiving a bitstream comprising plurality of encoded video frames, each video frame being divided into a plurality of macro-blocks;
determining macro-block dependencies based on prediction information in the received bitstream;
determining a set of macro-blocks having a lowest number of macro-block dependencies; and
embedding a watermark in macro-blocks selected from the set of macro-blocks having the lowest number of macro-block dependencies, wherein the number of macro-block dependencies associated with a given macro-block corresponds to a number of neighboring macro-blocks referenced during inter-frame and intra-frame prediction of the given macro-block.

25. The non-transitory computer readable medium of claim 24, wherein the step of determining the macro-block dependencies comprises:
analyzing the prediction information; and
building a link-list of macro-block dependencies based on analyzing the prediction information.

26. The non-transitory computer readable medium of claim 25, wherein the step of determining the set of macro-blocks having the lowest number of macro-block dependencies comprises:
sorting the link list by dependency layers;
determining a number of available macro-blocks per dependency layer;
computing a start layer based on the number of macro-blocks per dependency layer and a bit rate of a watermark signal; and
selecting the set of macro-blocks having the lowest number of macro-block dependencies based on the computed start layer.

27. The non-transitory computer readable medium of claim 24, wherein the program further instructs the processor to perform the steps of:
entropy decoding the received bitstream before the step of determining the macro-block dependencies;
assembling an output bitstream comprising watermarked macro-blocks; and
entropy encoded the assembled output bitstream.

* * * * *